United States Patent [19]

Lordi et al.

[11] Patent Number: 4,798,868

[45] Date of Patent: Jan. 17, 1989

[54] TERNARY BLENDS OF POLYVINYL CHLORIDE

[75] Inventors: Frank E. Lordi, West Chester, Pa.; Peter J. Vanderpool, Cherry Hill, N.J.

[73] Assignee: Arco Chemical Company, Newtown Square, Pa.

[21] Appl. No.: 82,260

[22] Filed: Aug. 6, 1987

[51] Int. Cl.[4] ........................ C08L 35/06; C08L 39/04

[52] U.S. Cl. ...................................... 525/207; 525/205

[58] Field of Search ................................ 525/207, 205

[56] References Cited

U.S. PATENT DOCUMENTS 3,626,033 12/1971 Keskkula et al. .................. 525/207

*Primary Examiner*—Jacob Ziegler

*Attorney, Agent, or Firm*—Lewis J. Young

[57] ABSTRACT

Disclosed are modable polyblends comprising a polyvinyl chloride resin blended with a copolymer of an unsaturated dicarboxylic acid moiety and a monomer copolymerizable therewith and an interfacial modifier to form a blend having improved mechanical and physical porperties. The dicarboxylic acid copolymer may be with or without rubber modifiers.

4 Claims, No Drawings

TERNARY BLENDS OF POLYVINYL CHLORIDE

BACKGROUND OF THE INVENTION

The present invention is directed to polyblends of (a) high performance polyvinyl chloride resins, (b) high molecular weight non-equimolar copolymers of ethylenically unsaturated dicarboxylic acids, or their derivatives, and at least one copolymerizable monomer, and (c) certain copolymers which serve to interface with the other two ingredients.

Polyvinyl chloride, in addition to being relatively inexpensive, is a polymer which can be easily modified to obtain an excellent balance of physical properties. The polymer is inherently flame retardant and has outstanding chemical resistance. The primary deficiency of polyvinyl chloride is its poor heat resistance. Another deficiency is the inability to accept paint on its surface.

U.S. Pat. No. 3,626,033 teaches to overcome the brittleness and low temperature deformation of polyvinyl chloride by blending the polyvinyl chloride with a polydiene rubber nitrile graft copolymer and an anhydride containing copolymer such as a styrene/maleic anhydride copolymer.

U.S. Pat. No. 4,311,806 teaches to blend rubber-modified styrene/maleic anhydride copolymers into polyvinyl chloride. These binary blends had better heat distortion temperatures but lower impact properties. The blends may also contain a rubber modifed styrene/acrylonitrile copolymer. The ternary blends had improved heat distortion temperature with increased impact properties.

U.S. Pat. No. 4,339,554 teaches to blend styrene/maleic anhydride copolymer into polyvinyl chloride in order to increase the heat distortion temperature. U.S. Pat. No. 4,371,666 also teaches this blend and points out that blends with at least 40% polyvinyl chloride are flame retardant.

U.S. Pat. No. 4,469,844 and U.S. Pat. No. 4,469,845 teach to blend both styrene/maleic anhydride copolymers and rubber-modified styrene/maleic anhydride copolymers with rubber-modified polyvinyl chloride. These blends had increased impact properties but had lower heat distortion temperatures than the polyvinyl chloride alone.

BRIEF SUMMARY OF THE INVENTION

We have now found that the desirable properties and the high use-temperature of the polyvinyl chloride can be retained while increasing the impact properties and the heat distortion temperature by blending the PVC with copolymers of an ethylenically unsaturated dicarboxylic acid moiety and one or more monomers copolymerizable therewith and an interfacial modifier selected from the group of copolymers consisting of methyl methacrylate/glutarimide copolymer, alpha-methylstyrene/acrylonitrile copolymer and methyl methacrylate/N-arylmaleimide copolymer.

These polyblends are easily fabricated to form high strength moldings having good weld line strength and improved mechanical and physical properties. Further, the presence of the polar functions in the ternary blend allows the molded parts to be painted.

DETAILED DESCRIPTION OF THE INVENTION

The polyblends of the present invention are moldable compositions comprising (a) about 60 to about 70% by weight based on total polyblend of a polyvinyl chloride resin;

(b) about 20 to about 30% by weight based on total polyblend of a high molecular weight non-equimolar copolymer of ethylenically unsaturated dicarboxylic acids, or their derivatives, and at least one copolymerizable monomer; and (c) about 10 to about 20% by weight of a copolymer capable of interfacial modification of the other two ingredients.

As used herein, the term "high molecular weight" means a weight average molecular weight of at least 100,000.

The Polyvinyl Chloride Resin

The polyvinyl chloride resin useful in the instant blends may be any of the known injection molding or extrusion grade resins available commercially. The resin may be a homopolymer of vinyl chloride or a copolymer of vinyl chloride with a minor portion of one or more monomers copolymerizable with vinyl chloride. In such copolymers vinyl chloride comprises at least about 80 to 90 wt-% of the copolymer. The copolymerizable monomers may be vinylidene chloride; vinyl acetate; vinyl stearate; acrylic and methacrylic acid esters; olefins such as ethylene, propylene, isobutylene and the like; vinyl alkyl ethers such as vinyl isobutyl ether, vinyl lauryl ether, and vinyl cetyl ether; acrylic acid and methacrylic acid; acrylonitrile and methacrylonitrile; diethyl fumarate; maleic anhydride; dimethyl itaconate; styrene; N-vinyl carbazole; N-vinyl pyrrolidone; allyl compounds such as allyl chloride; diolefins such as butadiene, isoprene, chloroprene and the like; or mixtures thereof. Further, the vinyl chloride resin may be a wholly or partially chlorinated polyvinyl chloride and the like.

The High Molecular Weight Non-equimolar Copolymer

Suitable high molecular weight non-equimolar copolymers are comprised of a minor amount, that is, less than 50 mole percent, of an ethylenically unsaturated dicarboxylic acid moiety and a major amount, that is, greater than about 50 mole percent, of one or more monomers copolymerizable therewith.

The acid moiety may be an ethylenically unsaturated dicarboxylic acid, its anhydride, its imide or substituted imides or a half acid derivative of such a dicarboxylic acid or mixtures thereof. Suitable acids and their derivatives useful in the present invention are maleic acid, fumaric acid, itaconic acid, citraconic acid, mesaconic acid, ethyl maleic acid, methyl itaconic acid, chloromaleic acid, dichloromaleic acid, bromomaleic acid, dibromomaleic acid, and phenylmaleic acid, the anhydrides of these acids, the imides of these acids and their N-substituted derivatives, the acid amide derivatives, or the half esters of these with suitable alcohols. The alcohols used may be the primary and secondary alkanols containing up to 6 carbon atoms.

The imide derivatives may be prepared by reacting the starting anhydride or diacid copolymers with aqueous ammonia, ammonia, or amines. Suitable amines are the alkyl amines having 1 to 4 carbon atoms, such as methylamine, ethylamine, propylamine, isopropylamine,and butylamine; ethanolamine; aniline; benzylamine; allylamine and the like. Also suitable are the water soluble $\alpha,\gamma$ alkylenediamines having 2 to 6 carbon atoms in the alkylene group, such as ethylenediamine, and hexamethylenediamine. Arylenediamines, such as the phenylene diamines and benzidenes may also be used. The diamines are useful for preparing copolymers having various degrees of crosslinking. These diamines may be used alone or in combination with other monoamines to vary the degree of crosslinking.

The copolymerizable monomers may be vinyl aryl monomers, such as styrene, alpha-methylstyrene, nuclear-methylstyrenes, ethylstyrene, isopropylstyrene, tert-butylstyrene, chlorostyrenes, dichlorostyrenes, vinyl naphthalene and the like; unsaturated nitriles, such as acrylonitrile and methacrylonitrile; and acrylic monomers, such as acrylic acid, methacrylic acid, methyl acrylate, and methyl methacrylate. Mixtures of two or more of these copolymerizable monomers may be used if desired.

The high molecular weight non-equimolar copolymers may be prepared by any of the several methods available for their preparation. Thus, these copolymers may be prepared by solution copolymerization directly from the respective monomers by the incremental addition of the reactive monomer as taught by U.S. Pat. No. 2,971,939; by a continuous recycle polymerization process such as described in U.S. Pat. Nos. 2,769,804 and 2,989,517; or by the suspension polymerization process described in U.S. Pat. No. 3,509,110.

The high molecular weight molding grade non-equimolar copolymers as described above can be impact modified using any art-recognized method of incorporating the impact modifier, which modifier is, typically, at least one copolymer or homopolymer rubber or mixtures thereof. Preferably, the impact modifiers are incorporated into the monomer mixture prior to polymerization using for example any of the methods of U.S. Pat. No. 4,097,551 (incorporated herein by reference).

Particularly suitable for use are the high molecular weight non-equimolar copolymers of styrene and maleic anhydride designated DYLARK® commercially available from ARCO Chemical Company. Suitable DYLARK copolymers include those of the DYLARK 200 series of copolymers, the DYLARK 300 series of copolymers and DYLARK 700 series of copolymers. Of these DYLARK copolymers, DYLARK 250, DYLARK 350, and DYLARK 700 are rubbermodified as described above.

The Interfacial Modifiers

Interfacial modifiers are those materials capable of increasing the compatability of the polyvinyl chloride resins and the styrene/maleic anhydride copolymers.

Particularly suitable interfacial modifiers are selected from the group consisting of a methyl methacrylate/-glutarimide copolymer; a methyl methacrylate/N-arylmaleimide copolymer; and an alpha-methylstyrene/acrylonitrile copolymer.

The methyl methacrylate/glutarimide copolymer

The methyl methacrylate/glutarimide copolymers suitable for use in this invention are made by the reaction of polymethyl methacrylate with urea, ammonia, or an amine to cause imidization to occur along the methacrylate chain. Obviously, the imidization could be effected on copolymers of methyl methacrylate with, for example, styrene. The complete imidization of polymethyl methacrylate would give a polyglutarimide derivative. The more probable product of the reaction of polymethyl methacrylate with an amine would be a copolymer of methyl methacrylate and glutarimide. One such commercially available copolymer was a copolymer sold as IRD-10 by Rohm & Haas Co. A method of preparation of these copolymers is given in U.S. Pat. No. 4,246,374.

The methyl methacrylate/N-arylmaleimide copolymer

The methyl methacrylate/N-arylmaleimide copolymers suitable for use in this invention are random copolymers having peak molecular weights within the range of from about 100,000 to about 500,000, preferably 250,000 to 350,000. The copolymers can be prepared by a free radical polymerization in solution, in bulk, or by suspension. The copolymers will comprise from about 10 to about 25 weight percent N-arylmaleimide and 90 to 75 weight percent methyl methacrylate. Preferably, the copolymers will be prepared by aqueous suspension polymerization.

The N-arylmaleimides particularly useful in the invention include N-phenylmaleimide and substituted derivatives thereof in which at least one of the aromatically bound hydrogen atoms has been substituted by a halogen atom, a nitro group, a nitrile group, aryl, aralkyl, aralkoxy alkyl or an alkyl or alkoxy group containing from 1 to 4 carbon atoms. The preferred N-arylmaleimide is N-phenylmaleimide.

The alpha-methylstyrene/acrylonitrile copolymer

The alpha-methylstyrene/acrylonitrile copolymer suitable for use in the blends of this invention are random copolymers made by copolymerization of the monomers in aqueous suspension. The copolymers comprise 60 to 70 weight-percent alpha-methylstyrene, 32–29 weight-percent acrylonitrile, and 0–7 weight-percent styrene and have a number average molecular weight of greater than 40,000. A method of preparing this copolymer is described in U.S. Pat. No. 4,169,195. A commercially available copolymer is sold by Borg Warner Corp. as BLENDEX-586.

The blends of this invention may be prepared by any method giving intimate mixing of the ingredients. Preferably, the polyblends are prepared by melt mixing at a temperature above the softening points of the polyblends using any conventional low shear melt mixing apparatus, including some twin screw extruders, single screw extruders, and the like. The polyblend extrudate can be chopped into pellets and fabricated using any conventional method of fabrication including injection molding, extrusion, compression molding, and the like.

The following examples are meant to illustrate, but not limit, the invention.

EXAMPLE I

To illustrate the effect of the blending of the invention, Geon 85857 manufactured by B. F. Goodrich was blended with DYLARK 350, a copolymer of styrene and maleic anhydride containing 8 mole-percent of anhydride and 15 mole-percent of a diene rubber. To the blend was added the compatibilizing agents. The materials used were melt blended on a two-roll mill for about 4 minutes at a temperature of approximately 400° F. A strip was then cut from the roll and compression molded at 380° F. for five minutes under 20,000 psi into 6″×6″×0.125″ samples. These test plaques were cut and machined into appropriate test specimens for the following tests: Izod impact (ASTM D-256), DTUL @264 psi (ASTM D-648), and Gardner impact at both 73° F. and −20° F. (ASTM D-3763).

The weld line properties were determined by extruding the compositions in a profile extruder into a shape defined as an "M" channel that was specifically modified to allow for weld line and non-weld line areas. The compositions were extruded using a melt temperature of 380°-390° F. Profile thickness was kept in the 58-64 mil range to simulate thin sections.

The compatibilizing agent used was a methyl methacrylate/N-phenylmaleimide copolymer (MMA/NPMI) prepared as shown below. The properties of the blends are reported in Table I.

Preparation of MMA/NPMI Copolymer

A citrate bottle was charged with 53.5 g of methyl methacrylate, 16.5 g of N-phenylmaleimide, 140 g of distilled water, 10 ml of a 9.1 wt-% tricalcium phosphate in water solution as the suspending agent, 0.003 g Of sodium bisulfite, 0.14 g Of t-butyl peroctoate and 0.06 g of t-butyl perbenzoate. The citrate bottle was placed in a bottle polymerizer at 95° C. for 3 hours and then 135° C. for 2 hours. The resulting MMA/NPMI copolymer beads were separated, washed with methanol and dried.

TABLE I

| Formulation | #1 | #2 | #3 | #4 | #5 | #6 |
|---|---|---|---|---|---|---|
| PVC, % | 100 | — | — | 69.9 | 69.9 | 69.9 |
| DYLARK 350, % | | 100 | — | 30.1 | — | 20.3 |
| MMA/NPMI, % | | | 100 | — | 30.1 | 9.8 |
| Properties | | | | | | |
| Notched Izod, Ft-Lb/in. | 3.5 | 2.7 | 0.5 | 10.0 | 1.5 | 8.0 |
| DTUL @ 264 psi, °F. | 155 | 207 | 243 | 165 | 183 | 173 |
| Gardner Impact, In-Lb | | | | | | |
| @ 73° F. | 480 | 80 | — | 480 | 216 | 480 |
| @ −20° F. | 100 | — | — | 200 | 50 | 225 |
| Gardner Impact, In-Lb/mil | | | | | | |
| Non-Weld | 6.7 | — | — | 2.5 | 1.8 | 6.5 |
| Weld Line | 6.4 | — | — | 1.2 | 1.8 | 5.7 |

From the data in the table, it may be seen that the ternary blend has improved heat resistance as measured by DTUL @ 264 psi vs a typical extrusion grade PVC. The blend also shows improved cold temperature impact properties. Improvement in weld strength by the addition of the interfacial modifier is also noted.

EXAMPLE II

To illustrate the use of methyl methacrylate/glutarimide copolymer the compositions given in Table II were blended and tested by standard ASTM test methods. The copolymer used was IRD-10 sold by Rohm & Haas Co. The results of testing are shown in Table II.

TABLE II

| Formulation | #1 | #2 | #7 | #8 |
|---|---|---|---|---|
| PVC, % | 100 | 69.9 | 69.9 | 69.9 |
| DYLARK 350, % | | 30.1 | — | 20.3 |
| IRD-10, % | — | — | 30.1 | 9.8 |
| Properties | | | | |
| Notched Izod, Ft-Lb/in | 3.5 | 10.0 | 1.7 | 11.0 |
| DTUL @ 264 psi, °F. | 155 | 165 | 183 | 174 |
| Gardner Impact, In-Lb | | | | |
| @ 73° F. | 480 | 480 | 320 | 480 |
| @ −20° F. | 100 | 200 | 75 | 320 |
| Gardner Impact, In-Lb/mil | | | | |
| Non-Weld | 6.7 | 2.5 | 2.5 | 6.3 |
| Weld Line | 6.4 | 1.2 | 2.5 | 5.7 |

Here again, the same trends are noted with regard to DTUL, impact, and weld strength.

When sample #8 was repeated substituting DYLARK 218 for the DYLARK 350, the results obtained were that the heat distortion temperature increased to 183.2° F. but the Gardner impact was only 200° F. This was attributed to the lack of rubber in the DYLARK 218.

EXAMPLE III

The method of Example I was repeated except the interfacial modifier used was an alpha-methylstyrene/acrylonitrile copolymer sold by Borg Warner Corp. as Blendex-586. The results of testing of these blends are shown in Table III.

TABLE III

| Composition | #1 | #2 | #9 | #10 | #11 | #12 |
|---|---|---|---|---|---|---|
| PVC, % | 100 | 69.9 | 69.9 | 69.9 | 59.9 | 59.9 |
| DYLARK 350, % | | 30.1 | — | 20.3 | — | 26.9 |
| Blendex 586, % | | | 30.1 | 9.8 | 40.1 | 13.2 |
| Properties | | | | | | |
| Notched Impact, Ft-Lb/in | 3.5 | 10.0 | 1.7 | 12.0 | 1.5 | 10.0 |
| DTUL @ 264 psi, °F. | 155 | 165 | 165 | 165 | 175 | 175 |
| Gardner Impact, In-Lb | | | | | | |
| @ 73° F. | 480 | 480 | 320 | 480 | 200 | 480 |
| @ −20° F. | 100 | 200 | 100 | 320 | 80 | 300 |
| Gardner Impact, In-Lb/mil | | | | | | |
| Non-Weld | 6.7 | 2.5 | 2.6 | 7.4 | — | — |
| Weld Line | 6.4 | 1.2 | 2.5 | 6.7 | — | — |

As before, the ternary blend has improved the impact properties at high and low temperatures and increased the heat distortion temperature over the PVC resin.

When the rubber modified DYLARK 350 in Sample #10 was replaced by a non-rubber modified DYLARK 218, the heat distortion temperature of the ternary blend was 172.3° F. but again the Gardner impact value was only 320 in-lbs.

We claim:

1. A moldable polyblend comprising 60 to 70 wt-% based on total polyblend of a polyvinyl chloride resin and 20 to 30 wt-% based on total polyblend of a non-equimolar copolymer of less than 50 mole-percent of an unsaturated dicarboxylic acid moiety and at least 50 mole-percent of at least one monomer copolymerizable therewith, and 10 to 20 wt-% based on total polyblend of interfacial modifier.

2. The polyblend of claim 1 wherein the polyvinyl chloride resin is a polyvinyl chloride.

3. The polyblend of claim 1 wherein the non-equimolar copolymer of an unsaturated dicarboxylic acid moiety and at least one monomer copolymerizable therewith is a styrene/maleic anhydride copolymer.

4. The polyblend of claim 1 wherein the interfacial modifier is a copolymer of alpha-methylstyrene and acrylonitrile.

* * * * *